US012598111B2

(12) United States Patent
Tran et al.

(10) Patent No.: US 12,598,111 B2
(45) Date of Patent: Apr. 7, 2026

(54) ENABLING INTENT-BASED NETWORK MANAGEMENT WITH GENERATIVE AI AND DIGITAL TWINS

(71) Applicant: AT&T Intellectual Property I, L.P., Atlanta, GA (US)

(72) Inventors: Xuan Tuyen Tran, Bridgewater, NJ (US); Ajay Rajkumar, Morristown, NJ (US); Yuxuan Jiang, Piscataway, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 25 days.

(21) Appl. No.: 18/676,653

(22) Filed: May 29, 2024

(65) Prior Publication Data
US 2025/0373503 A1 Dec. 4, 2025

(51) Int. Cl.
| | |
|---|---|
| *G06F 15/16* | (2006.01) |
| *G06F 9/54* | (2006.01) |
| *H04L 29/06* | (2006.01) |
| *H04L 41/14* | (2022.01) |
| *H04L 41/16* | (2022.01) |
| *H04W 28/08* | (2023.01) |

(52) U.S. Cl.
CPC ............ *H04L 41/16* (2013.01); *H04L 41/145* (2013.01); *H04W 28/0925* (2020.05)

(58) Field of Classification Search
CPC ... H04L 41/16; H04L 41/145; H04W 28/0925
USPC ......................................................... 709/224
See application file for complete search history.

(56) References Cited

U.S. PATENT DOCUMENTS

| | | | | |
|---|---|---|---|---|
| 10,200,248 | B1 * | 2/2019 | Jiang ................... | H04L 41/0879 |
| 10,439,875 | B2 * | 10/2019 | Mohanram ........... | H04L 41/145 |
| 10,693,738 | B2 * | 6/2020 | Nagarajan .............. | H04L 45/64 |
| 11,086,709 | B1 * | 8/2021 | Ratkovic .............. | G06F 11/079 |
| 11,283,691 | B1 * | 3/2022 | A ............................ | H04L 63/02 |
| 11,677,789 | B2 * | 6/2023 | Rungta ............... | H04L 41/5051 |
| | | | | 726/3 |
| 11,799,737 | B1 * | 10/2023 | Ottamalika ............. | H04L 43/04 |
| 11,909,592 | B2 * | 2/2024 | Wang ................... | H04L 41/0886 |
| 11,909,600 | B2 * | 2/2024 | Li .......................... | H04L 41/142 |

(Continued)

FOREIGN PATENT DOCUMENTS

| | | | | | |
|---|---|---|---|---|---|
| CN | 115623499 | A | * | 1/2023 | ............ H04W 24/02 |
| EP | 3716532 | A1 | * | 9/2020 | ......... H04L 41/0894 |
| EP | 4020921 | A1 | * | 6/2022 | ......... H04L 41/0823 |

OTHER PUBLICATIONS

LLM-Based Policy Generation for Intent-Based Management of Applications (Year: 2023).*

*Primary Examiner* — Hamza N Algibhah
(74) *Attorney, Agent, or Firm* — Guntin & Gust, PLC; Miyoung Shin

(57) ABSTRACT

Aspects of the subject disclosure may include, for example, an intent-based network (IBN) management system that effects changes in a communication network based on high-level intents. High-level intents are translated into operator-level intents by a large language model (LLM). Conflicts between operator-level intents are resolved, and the operator-level intents are mapped to intent functions. The intent functions are then mapped to policies that may effect changes in the network in accordance with the high-level intents. Other embodiments are disclosed.

20 Claims, 10 Drawing Sheets

(56) References Cited

U.S. PATENT DOCUMENTS

| | | | | |
|---|---|---|---|---|
| 11,929,886 | B2 * | 3/2024 | A | H04L 63/02 |
| 12,197,852 | B1 * | 1/2025 | Kushnikov | G06F 40/186 |
| 12,212,434 | B2 * | 1/2025 | Pfister | H04L 41/0806 |
| 12,259,927 | B1 * | 3/2025 | Chan | H04L 41/145 |
| 12,309,043 | B2 * | 5/2025 | Xu | H04L 41/145 |
| 12,341,658 | B2 * | 6/2025 | Brown | H04L 41/50 |
| 2016/0218933 | A1 * | 7/2016 | Porras | H04L 41/147 |
| 2018/0278480 | A1 * | 9/2018 | Prasad | H04L 41/0894 |
| 2020/0351167 | A1 * | 11/2020 | Sharma | H04L 41/14 |
| 2022/0045932 | A1 * | 2/2022 | Wang | H04L 63/0218 |
| 2022/0311671 | A1 * | 9/2022 | Jamkhedkar | G06F 16/9024 |
| 2022/0321408 | A1 * | 10/2022 | Mahimkar | H04L 41/0886 |
| 2022/0342649 | A1 * | 10/2022 | Cao | G06F 8/61 |
| 2022/0393953 | A1 * | 12/2022 | A | H04L 41/0866 |
| 2023/0254221 | A1 * | 8/2023 | A | H04L 41/0803 |
| | | | | 709/223 |
| 2024/0097983 | A1 * | 3/2024 | A | H04L 41/0894 |
| 2024/0176709 | A1 * | 5/2024 | A | G06F 16/125 |
| 2024/0177710 | A1 * | 5/2024 | Kumar Saha | G10L 15/1822 |
| 2024/0251293 | A1 * | 7/2024 | Jeong | H04W 28/0925 |
| 2024/0267794 | A1 * | 8/2024 | Shakkottai | G06N 3/0455 |
| 2024/0291716 | A1 * | 8/2024 | Kumar | H04L 41/084 |
| 2024/0364593 | A1 * | 10/2024 | Gomes Da Silva | H04L 41/16 |
| 2024/0381232 | A1 * | 11/2024 | Kovács | H04W 24/02 |
| 2024/0388501 | A1 * | 11/2024 | Chen | H04L 41/16 |
| 2025/0088946 | A1 * | 3/2025 | Grida Ben Yahya | H04L 41/16 |

* cited by examiner

100

200A

TRANSLATE HIGH-LEVEL INTENTS INTO
NETWORK OPERATOR-LEVEL INTENTS USING A
LARGE LANGUAGE MODEL — 210E

PERFORM CONFLICT RESOLUTION ON THE
NETWORK OPERATOR-LEVEL INTENTS — 220E

MAP THE NETWORK OPERATOR-LEVEL INTENTS
INTO INTENT FUNCTIONS — 230E

APPLY THE INTENT FUNCTIONS TO MODIFY RAN
POLICIES TO EFFECT RAN CHANGES IN
ACCORDANCE WITH THE HIGH-LEVEL INTENTS — 240E

<u>200E</u>

300

600

ENABLING INTENT-BASED NETWORK MANAGEMENT WITH GENERATIVE AI AND DIGITAL TWINS

FIELD OF THE DISCLOSURE

The subject disclosure relates to intent-based networking (IBN).

BACKGROUND

Intent-based networking (IBN) is a network management approach that simplifies operations by focusing on high-level, abstract policies (intents) to express desired outcomes instead of specifying the steps to achieve them. This approach enables non-experts to manage networks, while automation translates intents into configurations and deploys them across the infrastructure. However, translating high-level intents into low-level actions in IBN presents challenges such as complexity, ambiguity, scalability, compatibility, and security. These issues arise from diverse network components, unclear intent specifications, dynamically changing network conditions, potential misconfigurations, conflicting intents, and the like.

BRIEF DESCRIPTION OF THE DRAWINGS

Reference will now be made to the accompanying drawings, which are not necessarily drawn to scale, and wherein.

DETAILED DESCRIPTION

Figure 1:
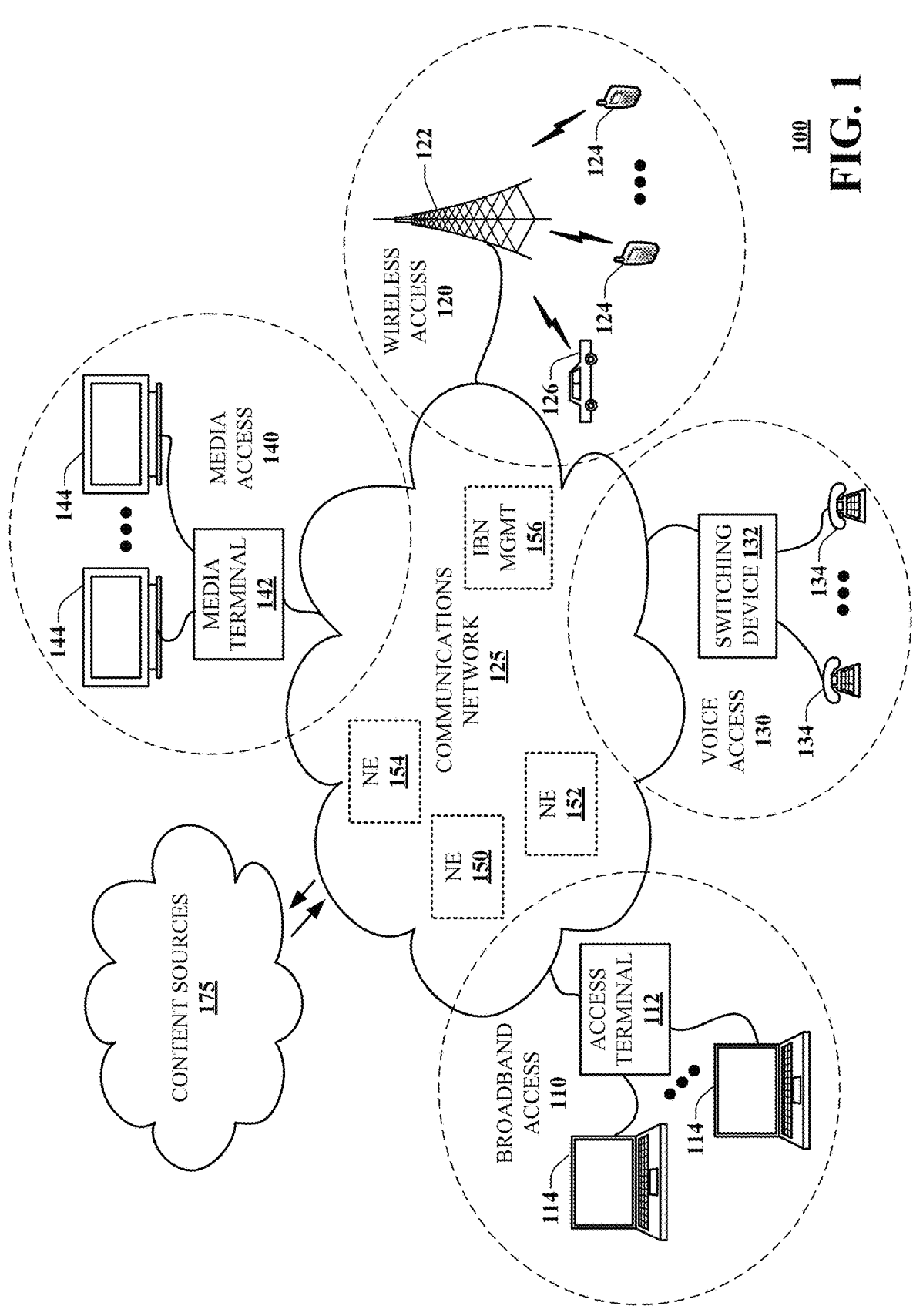
FIG. 1 is a block diagram illustrating an exemplary, non-limiting embodiment of a communications network in accordance with various aspects described herein.

The subject disclosure describes, among other things, illustrative embodiments for intent-based network management with generative AI and digital twins. Other embodiments are described in the subject disclosure.

One or more aspects of the subject disclosure include a device comprising a processing system including a processor; and a memory that stores executable instructions that, when executed by the processing system, facilitate performance of operations. The operations may include receiving network operator-level intents from a large language model that translates high level intents into the network operator-level intents; performing network operator-level intent conflict resolution on the network operator-level intents; mapping the network operator-level intents into intent functions; and applying the intent functions to modify radio access network (RAN) policies to effect RAN changes in accordance with the high level intents.

One or more aspects of the subject disclosure include a non-transitory machine-readable medium, comprising executable instructions that, when executed by a processing system including a processor, facilitate performance of operations. The operations may include receiving network operator-level intents from a large language model that translates high level intents into the network operator-level intents; performing network operator-level intent conflict resolution on the network operator-level intents; mapping the network operator-level intents into intent functions; and applying the intent functions to modify radio access network (RAN) policies to effect RAN changes in accordance with the high level intents.

One or more aspects of the subject disclosure include a method that may include receiving, by a processing system including a processor, network operator-level intents from a large language model that translates high level intents into the network operator-level intents; performing, by the processing system, network operator-level intent conflict resolution on the network operator-level intents; mapping, by the processing system, the network operator-level intents into intent functions; and applying, by the processing system, the intent functions to modify radio access network (RAN) policies to effect RAN changes in accordance with the high level intents.

Additional aspects of the subject disclosure include application-level conflict resolution of the intent functions; wherein the mapping the network operator-level intents into the intent functions comprises accessing the intent functions via application programming interface (API) calls; wherein the performing network operator-level intent conflict resolution is in accordance with requirements provided by a policy auditor, and wherein the intent functions comprise updating cell configurations.

Additional aspects of the subject disclosure include wherein the applying the intent functions comprises applying the intent functions to a digital twin of a physical RAN, wherein the operations further comprise applying the intent functions to the physical RAN, wherein the high level intents specify an expected increase in network users, and wherein the network operator-level intents specify an increased bandwidth requirement to support the expected increase in network users.

Intent-based networking (IBN) is a network management approach that simplifies operations by focusing on high-level, abstract policies (intents) to express desired outcomes instead of specifying the steps to achieve them. In various embodiments described herein, this approach enables non-experts to manage networks, while automation translates intents into configurations and deploys them across the infrastructure. Translating high-level intents into low-level actions in IBN presents challenges such as complexity, ambiguity, scalability, compatibility, and security. These issues arise from diverse network components, unclear intent specifications, dynamically changing network conditions, potential misconfigurations, and conflicting intents. Various embodiments described herein address these challenges to provide effective and secure network management.

Digital twins represent a paradigm shift in various industries by enabling what-if analysis and optimization using the digital replicas of the physical systems. Various embodiments described herein incorporate digital twins in the context of network management. Using digital twins, operators can explore scenarios, evaluate outcomes, and measure risks and costs before transitioning to real-world implementation. For example, digital twins enable simulation, analysis, and optimization of complex systems, leading to enhanced efficiency, agility, and informed decision-making.

Generative artificial intelligence (AI), specifically Large Language Models (LLMs), is equipped with capabilities to understand natural languages and extract relevant information. Various embodiments described herein incorporate generative AI and LLMs to significantly contribute to overcoming IBN challenges by interpreting high-level intents, translating them into low-level actions, mapping them to existing network policies or deriving new policies based on lower-level capabilities, and identifying potential conflicts.

Various embodiments described herein realize the vision of IBN through a holistic system that integrates the state-of-the-art language models to interpret high-level intents into concrete commands that can be executed by a network orchestration and management layer. Because directly implementing LLM-guided commands in real-time environments can carry significant risks, from misinterpretations to unforeseen technical glitches, various embodiments incorporate the use of digital twins, which offer an environment to experiment and refine LLM's directives in a secure, risk-free, and cost-efficient setting.

High-level intents can often be vague or ambiguous. This ambiguity can arise from the language used to describe the intent, the complexity of the network, or even from the user not being entirely clear about their objectives. A classic example is what "optimize network performance" might mean: Does it refer to latency, bandwidth, coverage, or some other metrics? If an intent is misinterpreted, it can lead to configurations that deviate from the desired outcome. In worst-case scenarios, such misconfigurations can lead to significant network downtimes and service disruptions. Even when the high-level intent is clear, translating it into specific, low-level network configurations that achieve that intent is challenging. The successful system will understand the nuances and dependencies of network components and how they interact. For example, a change in coverage from one area can unintentionally affect another, making it challenging to ensure that a high-level intent doesn't inadvertently disrupt a different part of the network.

In scenarios where multiple high-level intents are provided, there might be inherent conflicts between them. For instance, one intent might prioritize energy saving, while another could emphasize coverage improvement. Balancing or choosing between potentially conflicting intents becomes a complex challenge. Without a clear hierarchy or prioritization mechanism, the IBN system might struggle to determine which intent should take precedence when conflicts arise. To guarantee that configurations accurately reflect the original intent and do not lead to any misconfigurations/negative effects to the network, various embodiments described herein incorporate robust validation and verification systems.

As described herein, the integration of IBN with LLMs and Digital Twins offers a beneficial approach to network management. While LLM interprets high-level intents, ensuring they are accurately translated into network configurations, Digital Twins provide a virtual replica of the physical network, allowing these configurations to be tested in a virtual environment before actual deployment. Example improvements over previous approaches include interactive interpretation, risk mitigation, real-time feedback and adjustments, reduced human error, and the like.

LLM's advanced AI capabilities offer a more dynamic and nuanced understanding of high-level intents compared to traditional rule-based or policy-based systems. This enables a closer alignment of network behavior with organizational goals. LLM is also capable of carrying out interactive conversations with intent issuers in order to get more clarification on the intent, or to make suggestions and refine the intents which will help in better interpretation.

By using digital twins, configurations derived from intents can be rigorously tested in a virtualized environment, minimizing the risk of misconfigurations in the live network. This provides a safety net not present in traditional network simulators, which aren't as reflective of real-world complexities.

The combination allows for a tighter feedback loop, with the LLM adjusting configurations based on real-time feedback from the digital twin, ensuring that the network continuously aligns with the stated intent. In some embodiments, this real-time feedback may also be propagated and presented in an easy-to-understand manner back to the intent originator to adjust an intent based on what is possibly actionable by the network. While traditional approaches often relied on manual configurations or template-based setups, the integration of LLM and digital twins automates and streamlines the process, significantly reducing the potential for human error.

Referring now to FIG. 1, a block diagram is shown illustrating an example, non-limiting embodiment of a system 100 in accordance with various aspects described herein. For example, 100 can facilitate in whole or in part intent-based network management with generative AI and digital twins. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Communication network 125 also includes intent-based network (IBN) management system 156. IBN management system 156 includes devices, and performs methods, that can be used to configure portions of communication network 125 based on high-level intents. For example, a user or network administrator may provide high-level intents to IBN management system 156. Examples of high-level intents include any desired outcome or network attribute expressed at a high level. For example, a high-level intent may be expressed as "we need more bandwidth at the stadium between 5 pm and 7 pm" or "reduce power across the RAN at night." In some embodiments, IBN management system 156 includes an artificial intelligence (AI) machine that has been suitably trained to convert the high-level intents to lower-level intents, referred to herein as "operator-level intents." Examples of operator-level intents include intents expressed at a level that is actionable by a network operator. For example, an operator-level intent may be expressed as "limit handoffs to RAN nodes serving the stadium between 5 pm and 7 pm" or "shut down radios serving frequency band X between 1 am and 7 am." IBN management system 156 then maps the operator-level intents to RAN function policies to effect the desired network changes. These and other embodiments are described further below with reference to later figures.

IBN management system 156 may be implemented in any manner. For example, in some embodiments, IBN management system 256 may be implemented in a management layer, and in other embodiments, IBN management system 156 may be implemented in an orchestration layer. In still further embodiments, IBN management system may be implemented in an operating system (OS) layer with communication network 125.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

Base station 122 may be one of many nodes in a radio access network (RAN). The RAN and the nodes in the RAN may be configured according to RAN policies. Examples of RAN policies include, but are not limited to, subscription policies, control policies, power management policies, and the like. In various embodiments, RAN policies may be modified by IBN MGMT system 156. For example, IBN MGMT system 156 may receive high-level intents from an operator and/or user. The IBN MGMT system 156 may include an AI model (e.g., a large language model) that translates the high-level intents into operator-level intents, performs conflict resolution on the operator-level intents, maps the network operator-level intents into intent functions; and applies the intent functions to modify radio access network (RAN) policies to effect RAN changes in accordance with the high level intents. These and other embodiments are described further below.

Figure 2A:
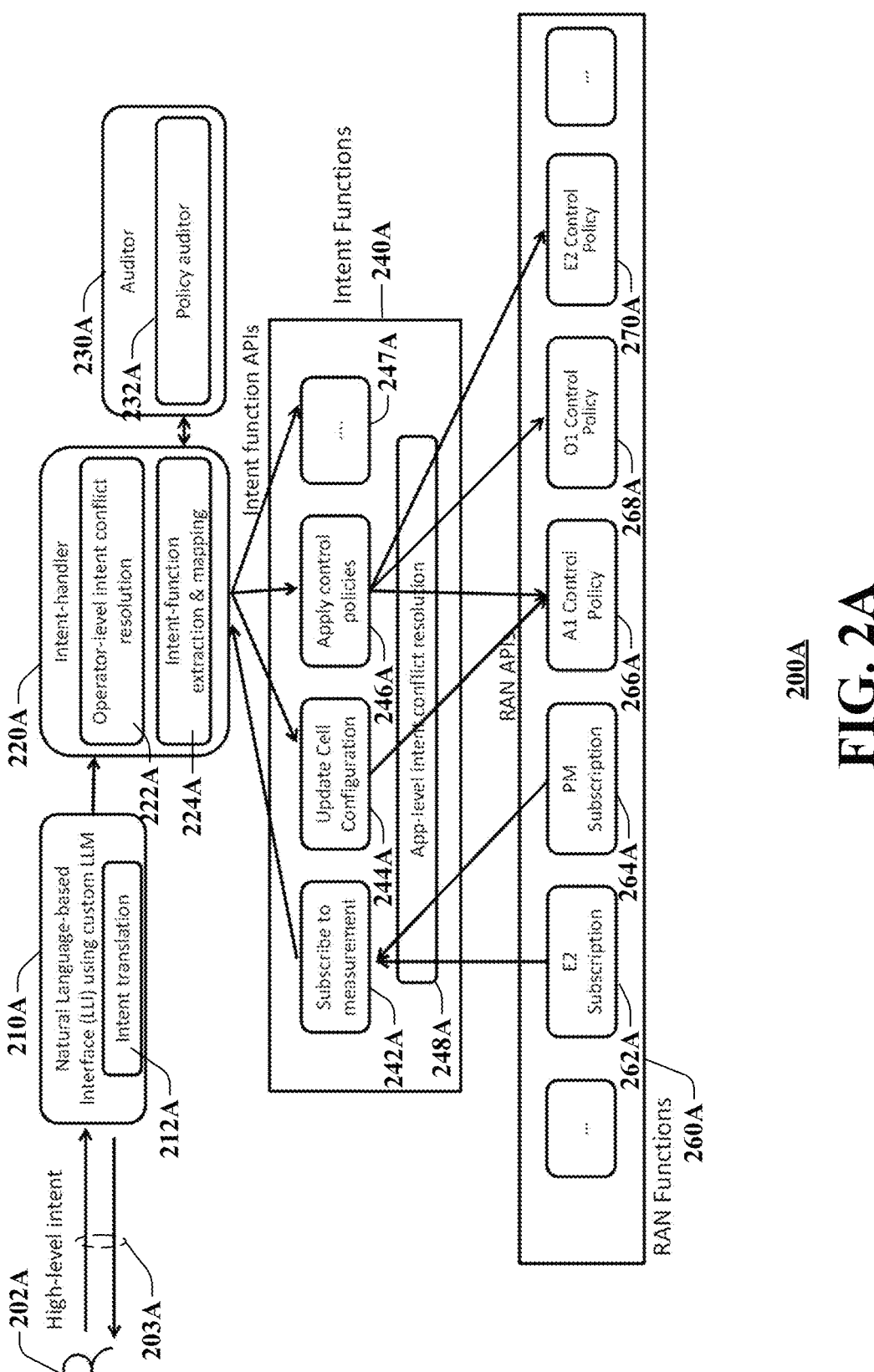
FIG. 2A is a block diagram illustrating an example, non-limiting embodiment of an intent-based network management system with generative AI functioning within the communication network of FIG. 1 in accordance with various aspects described herein.

FIG. 2A is a block diagram illustrating an example, non-limiting embodiment of a system functioning within the communication network of FIG. 1 in accordance with various aspects described herein. System 200A represents an example embodiment of IBN management system 156 (FIG. 1). System 200A includes a natural language-based interface 210A using a large language model (LLM) that receives high level intents 203A from user 202A, intent handler 220A, auditor 230A, intent functions 240, and RAN functions 260A.

Natural language-based interface 210A includes intent translation 212A that translates the human-expressed intentions received at 203A into a more structured and concrete set of directives (e.g., operator-level intents) that can be programmatically managed and executed on a network. With the incorporation of the recent advancements in Language Models, particularly large language models (LLMs) like GPT variants, the natural language-based interface 210A can benefit significantly in understanding and translating intent.

In some embodiments, natural language-based interface 210A includes mechanisms that form a feedback loop to either seek clarification from user 202A or flag issues when ambiguities exist that prevent natural language-based interface 210A from converting high-level intents into operator-level intents. This feedback loop ensures that the generated directives are as accurate and actionable as possible.

User 202A may be any type of user, consumer, customer, enterprise customer, or the like. User 202A may provide high-level intents in the form of a time and space based request for resources. As a nonlimiting example, user 202A may be an enterprise customer that requests increased network resources for an event to be held in a stadium for a known time period (e.g., the Super Bowl). Example high-level intents expressed by this enterprise customer may be made in the form of "we expect 50,000 people in this geographical location (the stadium) for about six hours starting at 1 pm. Can you or any other provider provide us with additional resources during that time?"

In response to receiving this high-level intent, natural language-based interface 210A may translate the high level intent into actionable intents, such as throughput and latency requirements, and possibly how many cell sectors or additional cell sites may be needed to satisfy the high-level intents. In some embodiments, natural language-based interface 210A may query user 202A to determine the types of services are expected to be utilized (e.g., voice, text, video, unicast, broadcast, etc.) to resolve any ambiguities.

In some embodiments, natural language-based interface 210A has access to data that represents current usage or predicted future usage. For example, natural language-based interface 210A may, based on a combination of the high-level intents and the data representing current usage or data representing predicted future usage, determine an additional amount of network resources that will be needed to satisfy the high-level intents as well as the current (or predicted future) usage.

In some embodiments, intent translation block 212A implements translations that are specific to a network operator. For example, operator A may have a first number of RAN nodes with a certain number of cell sectors serving the stadium, and operator B may have a second number of RAN nodes with a certain number of cell sectors serving the stadium. When the natural language-based interface 210A is translating high-level intents for use by operator A, intent translation block 212A is a block with knowledge of the first number of RAN nodes in operator A's network, and when the natural language-based interface 210A is translating high-level intents for use by operator B, intent translation block 212A is a block with knowledge of the second number of RAN nodes in operator B's network.

Intent Handler 220A includes intent function extraction and mapping 224A and operator-level intent conflict resolution 222A. Intent function extraction and mapping 224A receives the operator-level intents from natural language-based interface 210A and extracts intent functions. Intent handler 220A ensures that these operator-level intents are correctly interpreted and mapped onto actionable configurations and operations on the network devices. Even if the intent has been translated from natural language, it's essential to ensure that the translated directives are correctly understood in the context of the network's capabilities and current state. In some embodiments, this includes parsing parameters, understanding the relationships between different elements of the directive, etc. Intent function extraction and mapping 224A also maps the given directives to specific network configurations and protocols that can fulfill the intent's requirements. For example, if the operator level intent directive says "establish high-priority communication for video users" it might involve setting up a specific QoS slice on the respective Core and RAN elements.

Intent handler 220A also provides operator-level intent conflict resolution at 222A. In a complex network, there might be multiple intents active simultaneously, or even a single intent might have conflicting requirements. The conflict resolution process ensures that such conflicts are identified and resolved to maintain optimized trade-offs and avoid unintended behavior. The first step is to identify if there are any conflicting intents. This could be in the form of overlapping requirements or mutually exclusive configurations. The conflicts might also arise due to the changing network conditions and might be present at only certain times. In situations where multiple intents are conflicting, the system may determine which intent should take precedence. This can be based on predefined rules, the criticality of the intent, timestamps, or even manual intervention.

If conflicts cannot be automatically resolved or if manual intervention is required, the system may notify the network operators (or the intent issuers) about the nature of the conflict and possibly provide suggestions for resolution. In some embodiments, the system adapts the intent slightly (if permissible) to fit the network's constraints and capabilities. This is done such that the primary objectives of the intent are still met.

The intent handler 220A may be implemented at multiple levels or there can be multiple intent handlers at different levels. For example, intent handler 220A may be implemented at the intent-translation layer, or after the intents have been converted to specific RAN app operations. This allows for modularization and equipping the intent handling functions with appropriate knowledge at different specific layers.

The Policy auditor 230A maintains a global view of the implemented policies. For example, policy auditor 230A may be responsible for tracking the policies or intent functions issued by the intent handler, conducting regular policy reviews to ensure the correctness and effectiveness of the policies, and managing the policy lifecycles. In some embodiments, policy auditor 230A records the policies issued by the intent handler, identifies potential conflicts between new and existing policies, and works with the intent handler to resolve the conflict before the new policy is implemented and impacts the network performance. Further, policy auditor 230A may provide extensive analytics and insights of existing policies.

In some embodiments policy auditor 230A conducts regular policy reviews. For example, policy auditor 230A may monitor the long-term effects on network performance of the policies and adjust/correct/reverse the policies that do not produce the expected outcome or impose negative impacts to the network. Policy auditor 230A may also ensure the implemented policies are still in compliance with the latest network standards, regulations, and organizational requirements. Policy auditor 230A may also manage policy lifecycles. For example, policy auditor 230A may manage and track the lifecycles of existing policies and recommend updates/removal of outdated policies.

Intent functions 240A includes multiple functions reachable by intent handler 220A. For example, intent functions 240A may include a function to subscribe to measurements 242A, a function to update cell configurations 244A, a function to apply control policies 246A, and any number of further functions represented by block 247A. In some embodiments, each of the intent functions 240A exposes an application programming interface (API) accessible by intent handler 220A. In these embodiments, intent handler 220A may perform function calls to each of the intent functions 240A to effect changes in the network as determined by the high-level intents and the operator-level intents.

In some embodiments, intent handler 220A may perform a function call to update cell configuration intent function 244A to update one or more parameters affecting a cell configuration. For example, a call to intent function 244A may be used to modify transmit power, modify an admission threshold (e.g., how many users are allowed to access a cell at a given time), throttle different activities (e.g., file downloading, video, etc.), modify a handover threshold, modify and antenna angle, update the available capacity threshold, and the like. For example, continuing with the Super Bowl example, intent handler 220A may perform a function call to update cell configuration intent function 244A to set a transmit power to a maximum level, and to increase an admission threshold from 30 users to 50 users at each cell. Also for example, in order to accommodate voice calls for all 50 users, file downloading and video streaming may be limited using a function call to update cell configuration intent function 244A.

In some embodiments, intent handler 220A may perform a function call to apply control policies intent function 246A to modify control policies in the radio access network. For example, control policies that may be modified include throttling traffic based on traffic type, modifying traffic priority or user priority based on traffic type, user level, user type, or the like. Also for example, intent handler 220A may modify a control policy to switch users receiving unicasts of the same stream to either a multicast or a broadcast to save bandwidth.

Figure 2B:
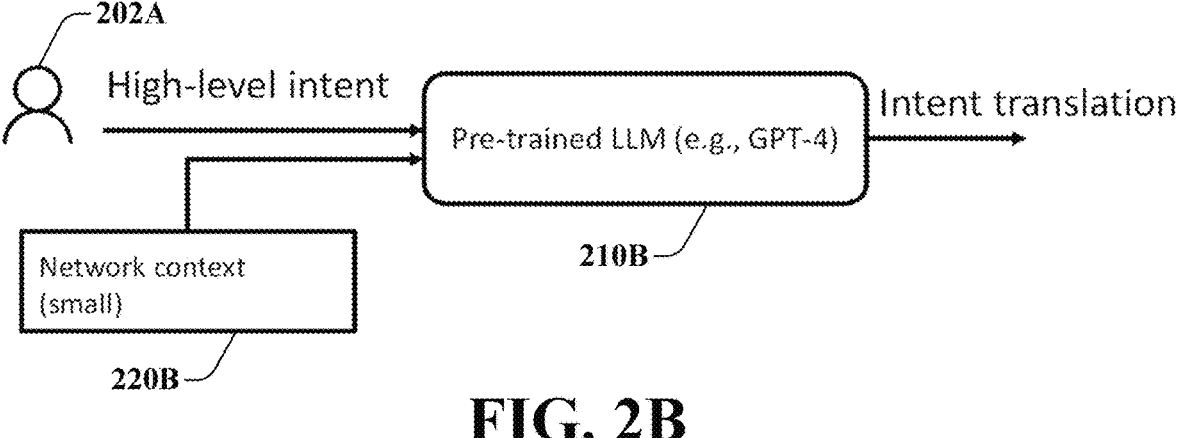
FIG. 2B is a block diagram illustrating an example, non-limiting embodiment of a natural language handler functioning within the system of FIG. 2A in accordance with various aspects described herein.

In some embodiments, intent handler 220A may perform a function call to subscribe to measurement intent function 242A to subscribe to RAN measurements accessible through the RAN APIs shown in FIG. 2B.

In some embodiments, intent functions 240A includes application level intent conflict resolution 248A. Application level intent conflict resolution 248A may monitor multiple intents simultaneously that are being requested by intent handler 220A to determine if there are any conflicts. Conflicts may arise in many ways including intents that affect the same key performance indicator (KPI) in a conflicting manner. For example, one intent may ask for energy savings and a second intent may request traffic steering within a particular set of localized cells. These two intents are completely independent; however one intent may result in turning off a particular cell whereas the other intent may result in that same particular cell being turned on because that is where the traffic is being steered. This generates a conflict between two intents which may be resolved by application level intent conflict resolution 248A.

Application level intent conflict resolution 248A may resolve conflicts in any manner. For example, in some embodiments, configurations that result in conflicts may be applied sequentially to resolve the conflict. In the example above, the particular cell may be turned off to save power for a period of time, and then the particular cell may be turned on to support traffic steering. Also for example, in some embodiments, when multiple configurations conflict, one configuration may be selected over the other to resolve the conflict. In the example above, it may be determined that supporting additional users is a higher priority than power savings, and the conflict may be resolved by maintaining power at the particular cell and steering traffic to the particular cell.

RAN functions 260A may include any number of functions capable of monitoring RAN operations and or network function operations as well as effecting policy within the RAN and or network functions. For example, RAN functions 260A is shown including E2 subscription 262A, PM subscription 264A, A1 control policy 266A, O1 control policy 268A, and E2 control policy 270A. E2, A1, and O1 are interfaces that provide access to RAN configurations and subscriptions and/or network function configurations and subscriptions. PM is a performance management subscription that allows the Intent functions to subscribe to performance management metrics.

In some embodiments, RAN functions 260A expose APIs (e.g., RAN APIs) that allow intent functions 240A to access the various RAN functions. For example, if intent function 244A wishes to update a cell configuration, then intent function 244A may place a function call to A1 control policy 266A using a RAN API to effect the cell change. Through changes to configurations and control policies at the RAN and at network functions, the original intent as specified by high-level intents 203A are propagated down to network functions and the RAN by RAN functions 260A.

FIG. 2B is a block diagram illustrating an example, non-limiting embodiment of a natural language handler functioning within the system of FIG. 2A in accordance with various aspects described herein. In some embodiments, prompt engineering is employed to guide the large language model to generate the desired outputs. In the example of FIG. 2B, a pre-trained large language model (LLM) 210B may be used in combination with a network context 220B. The network context provides prompts to the pre-trained LLM 210B along with the high-level intents, and the pre-trained LLM 210B translates the high-level intents to operator-level intents with the aid of the network context 220B. This approach allows the use of an off-the-shelf LLM.

Figure 2C:
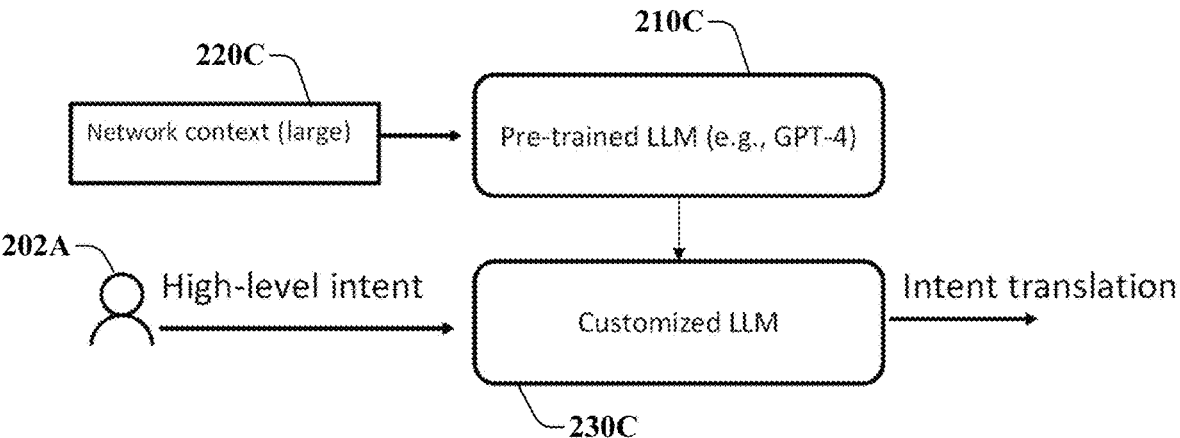
FIG. 2C is a block diagram illustrating an example, non-limiting embodiment of a natural language handler functioning within the system of FIG. 2A in accordance with various aspects described herein.

FIG. 2C is a block diagram illustrating an example, non-limiting embodiment of a natural language handler functioning within the system of FIG. 2A in accordance with various aspects described herein. In the example of FIG. 2C, a pre-trained large language model (LLM) 210C may be used in combination with a network context 220C and a customized LLM 230C. The network context is fed to the pre-trained LLM 210C, and the output of the pre-trained LLM 210C is fed to a customized LLM 230C along with the high-level intents, and the customized LLM 230C translates the high-level intents to operator-level intents. This approach allows the use of a combination of an off-the-shelf LLM, and a customized LLM.

In some embodiments, the customized LLM 230C may be customized using various methods, including for example, Retrieval Augmented Generation (RAG) or fine-tuning. This approach can customize LLM 230C using large amount of network context data, leading to decreased response time and token cost for each usage.

Figure 2D:
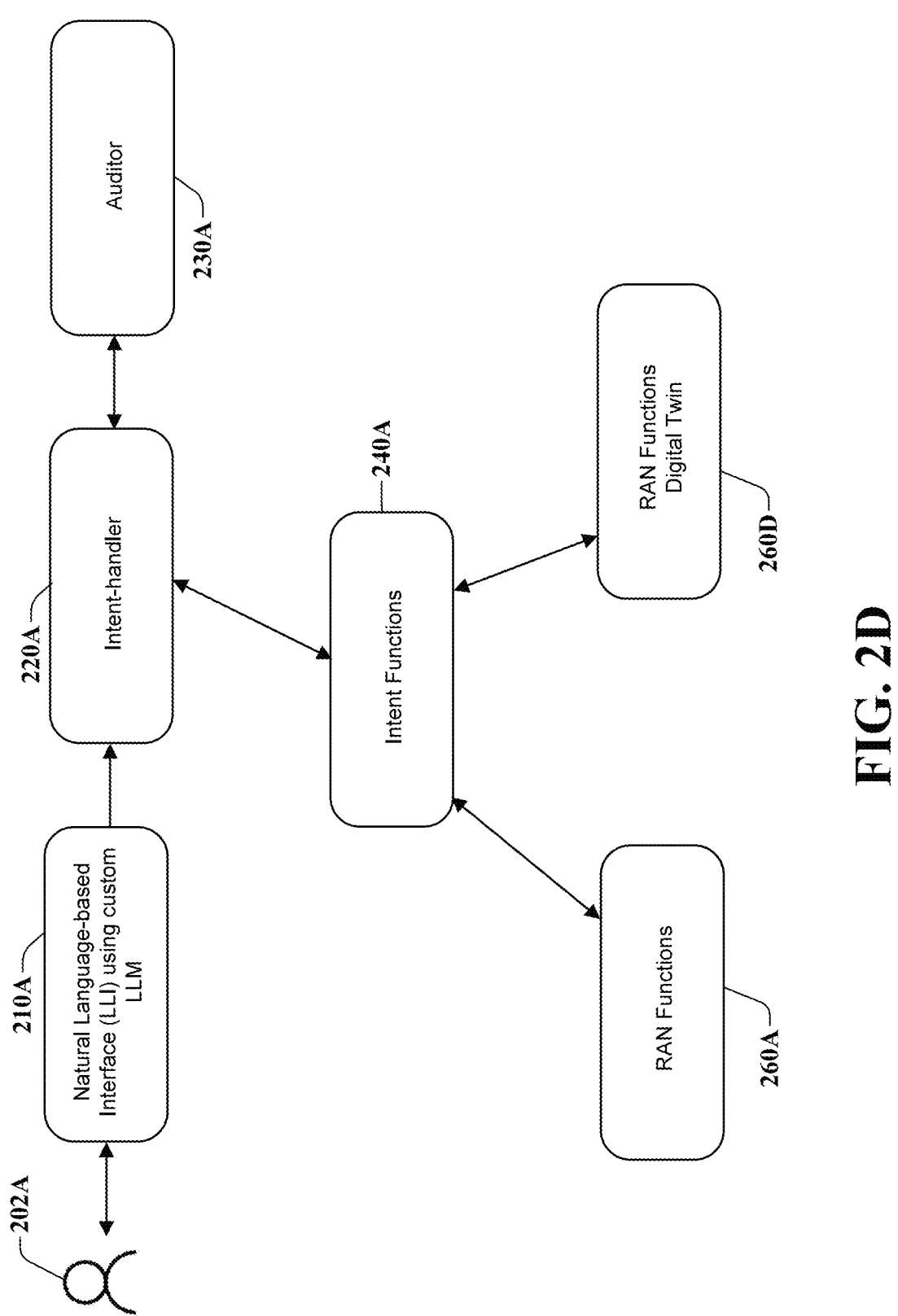
FIG. 2D is a block diagram illustrating an example, non-limiting embodiment of an intent-based network management system with generative AI and a digital twin functioning within the communication network of FIG. 1 in accordance with various aspects described herein.

FIG. 2D is a block diagram illustrating an example, non-limiting embodiment of an intent-based network management system with generative AI and a digital twin functioning within the communication network of FIG. 1 in accordance with various aspects described herein. FIG. 2D shows user 202A, natural language based interface 210A, intent handler 220A, auditor 230A, intent functions 240A, and RAN functions 260A, all of which are described above with reference to FIG. 2A. FIG. 2D also shows RAN functions Digital Twin 260D.

Digital Twin 260D includes replicas of RAN functions 260A, and in some embodiments, includes digital replicas of network nodes, RAN nodes, base stations, network nodes, and any other network resource that may be influenced by the high-level intents. In some embodiments, digital twin 260D creates virtual entities that replicate different configurations that may be used in the actual network.

Digital Twin 260D provides an environment to experiment and refine LLM's directives and to observe the effects of intent execution in representative network scenarios. For example, intent functions 240A may perform the policy changes on digital twin 260D before performing changes at the actual RAN functions 260A. This results in the ability to perform secure, risk-free and cost-efficient experiments, allowing for rapid iterations and development of GenAI-based IBN solutions.

In some embodiments, Digital Twin 260D is run in a sandbox environment. This is applicable for early ideation and experimentations in sandbox environment without affecting the real networks. In some embodiments, the Digital Twin 260 is run parallel with RAN functions 260A, referred to herein as "Digital Twin Co-Pilot." When used as a Digital Twin Co-Pilot, Digital Twin 260D is continually updated and synchronized with the real-world network state. Algorithms are first tested and refined in this up-to-date digital twin before implemented on real network. For example, in some embodiments, a Digital Twin may be used to iterate an improvement on a configuration before implementing on a physical network.

In still further embodiments, intents are executed directly on the real network without Digital Twin 260D in the loop. In this direct approach, intent translated operations are implemented straightaway on the actual network without any additional testing in digital twin environment. This allows for immediate implementation, minimizing delay for well-understood algorithms and/or troubleshooting procedures, or in case real-world testing is the only viable way to validate performance.

Figure 2E:
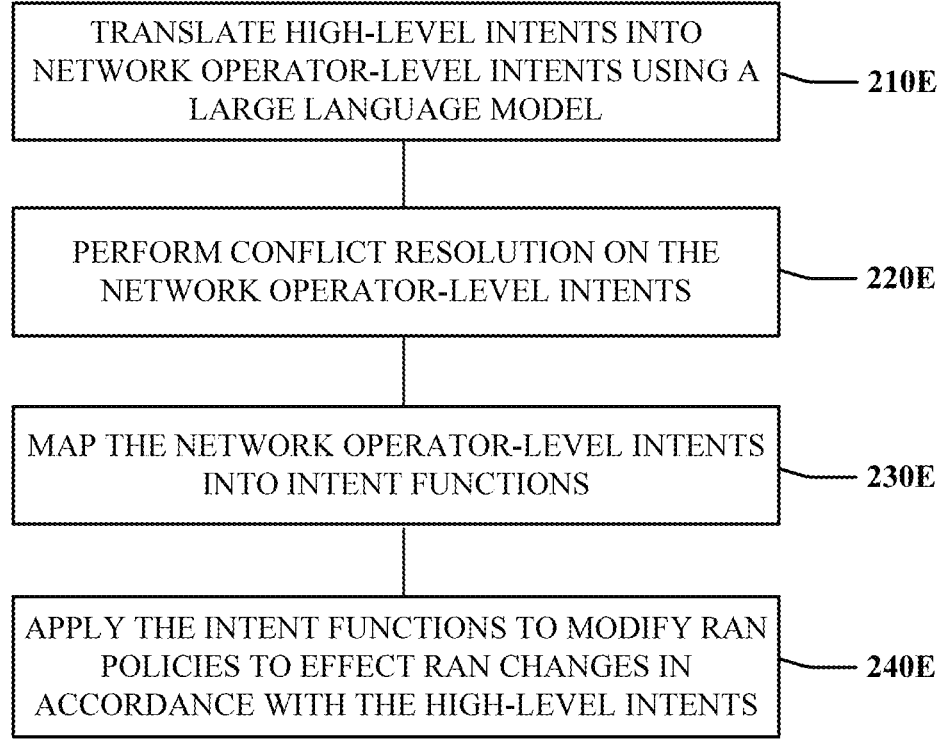
FIG. 2E depicts an illustrative embodiment of a method in accordance with various aspects described herein.

FIG. 2E depicts an illustrative embodiment of a method in accordance with various aspects described herein. At 210E of method 200E, high-level intents are translated into network operator-level intents using a large language model. In some embodiments, this corresponds to natural language based interface 210A receiving high-level intents 203A and translating them into operator-level intents provided to intent handler 220A (FIG. 2A). In some embodiments, the large language model also receives network context as described with reference to FIG. 2B. In still further embodiments, the large language model includes a pre-trained large language model that receives the high-level intents and the results of the pre-trained large language model are fed to a customized large language model which also receives a network context as described with reference to FIG. 2C.

At 220E, conflict resolution is performed on the network operator level intents. In some embodiments, the conflict resolution is performed in accordance with requirements provided by a policy auditor. Further, in some embodiments, the conflict resolution is performed by operator level intent conflict resolution 222A included within intent handler 220A (FIG. 2A).

At 230E, the network operator-level intents are mapped into intent functions. In some embodiments, this corresponds to the operations of intent function extraction and mapping 224A within intent handler 220A (FIG. 2A). Further, in some embodiments, the intent handler accesses intent functions using intent function APIs such as those shown in, and described with respect to, FIG. 2A. In some embodiments, application level conflict and resolution of the intent functions is performed. For example, in some embodiments, the intent functions include an application level conflict resolution block, such as application level intent conflict resolution 248A within intent functions 240A (FIG. 2A).

At 240E, the intent functions are applied to modify RAN policies to effect RAN changes in accordance with the high-level intents. In some embodiments, this corresponds to intent functions accessing RAN functions using APIs as shown in, and described with reference to, FIG. 2A. In some embodiments, the actions at 240E include applying the intent functions to a digital twin prior to, or in parallel with, applying the intent functions to modify actual RAN policies.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
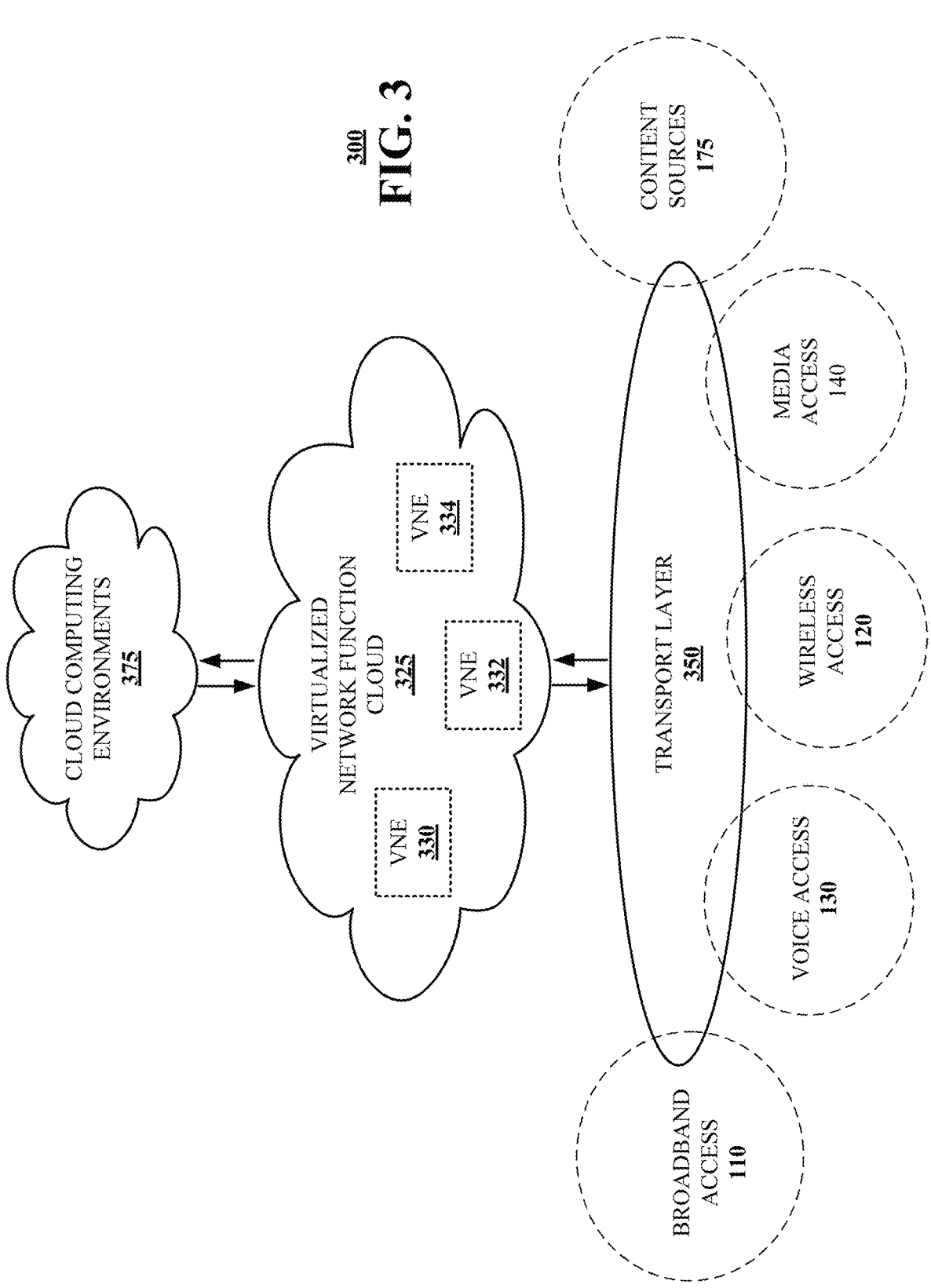
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the systems, subsystems, and functions described herein. For example, virtualized communication network 300 can facilitate in whole or in part an IBN management system that utilizes generative AI and digital twins.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
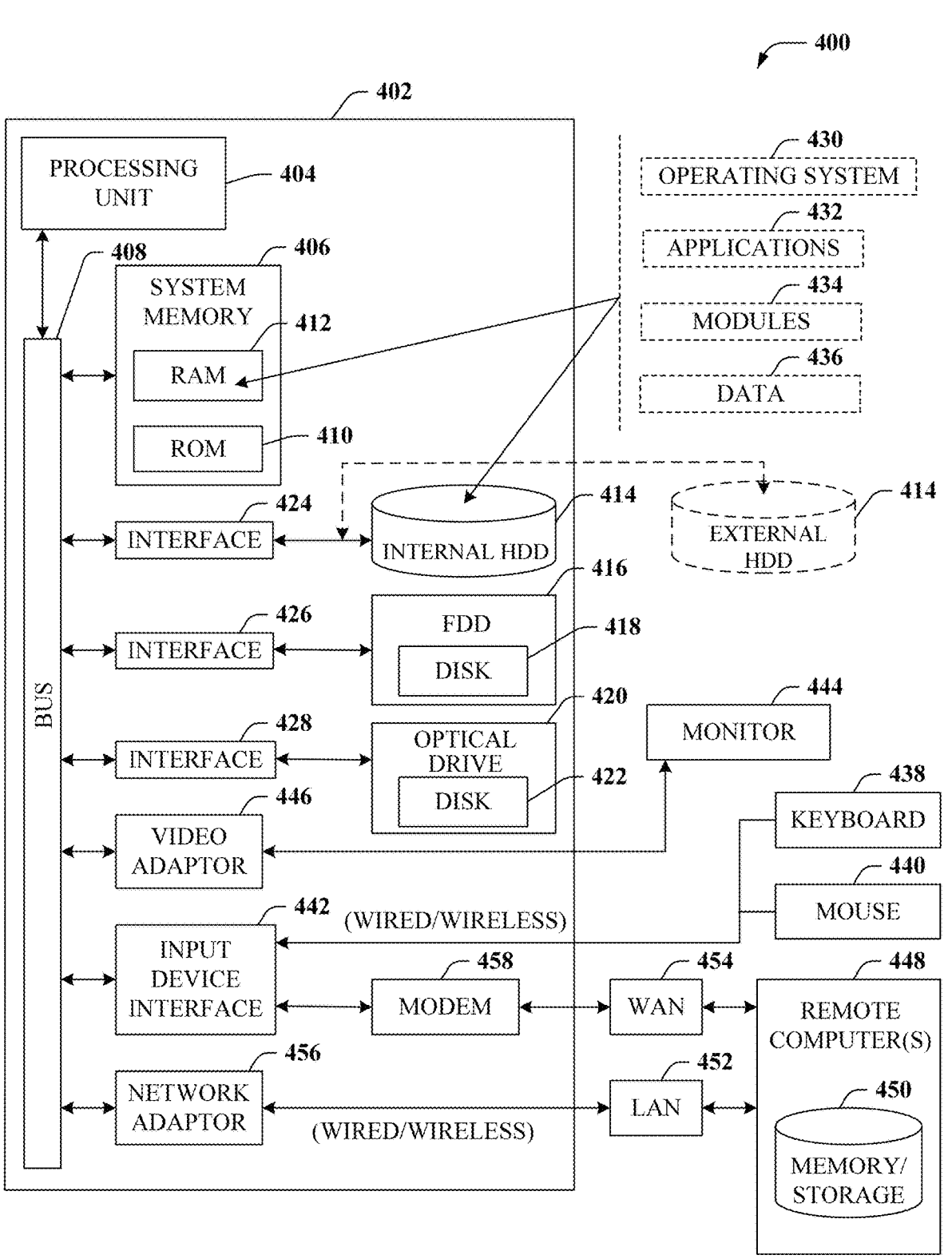
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part an IBN management system that utilizes generative AI and digital twins.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
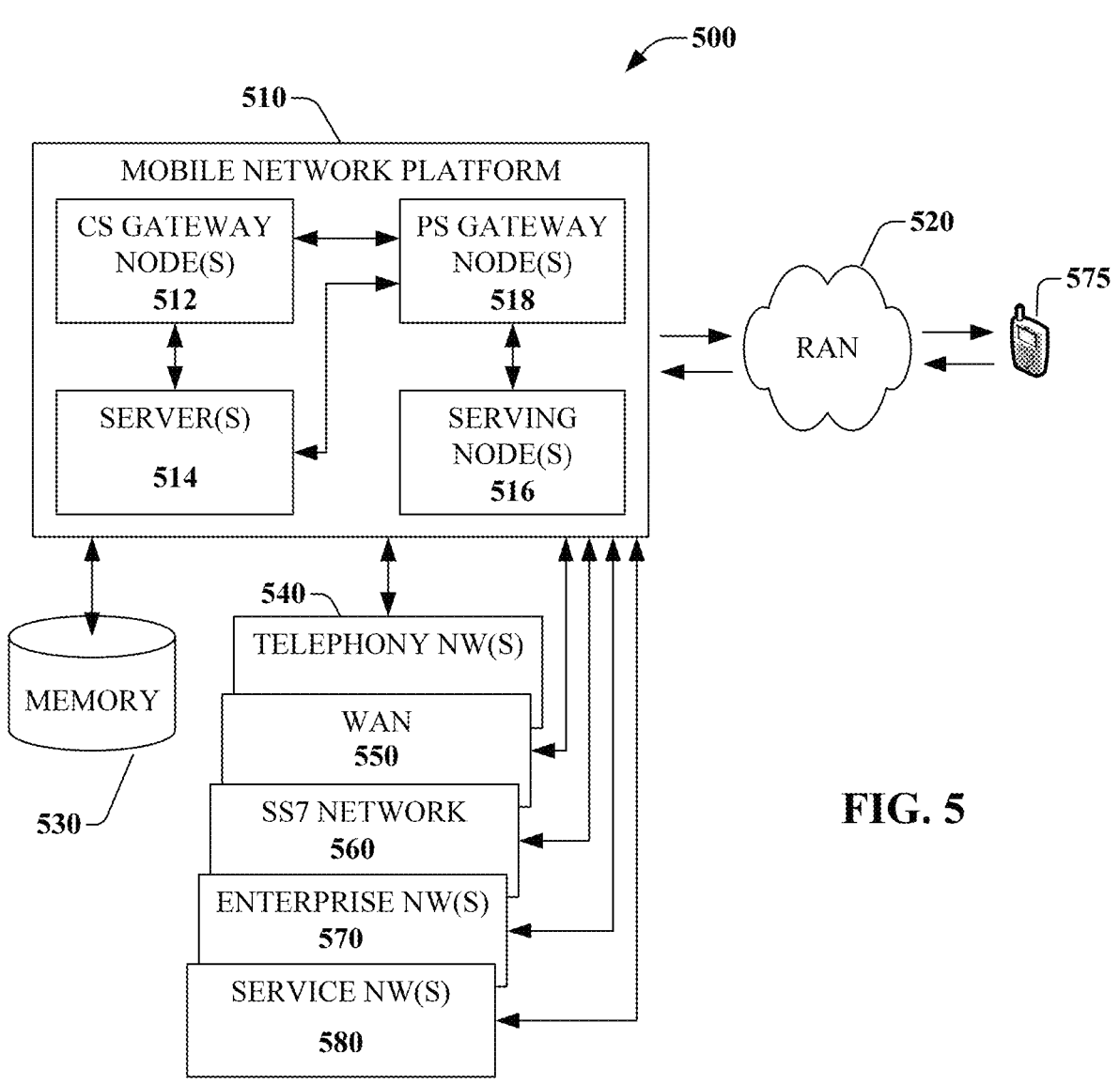
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part an IBN management system that utilizes generative AI and digital twins. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
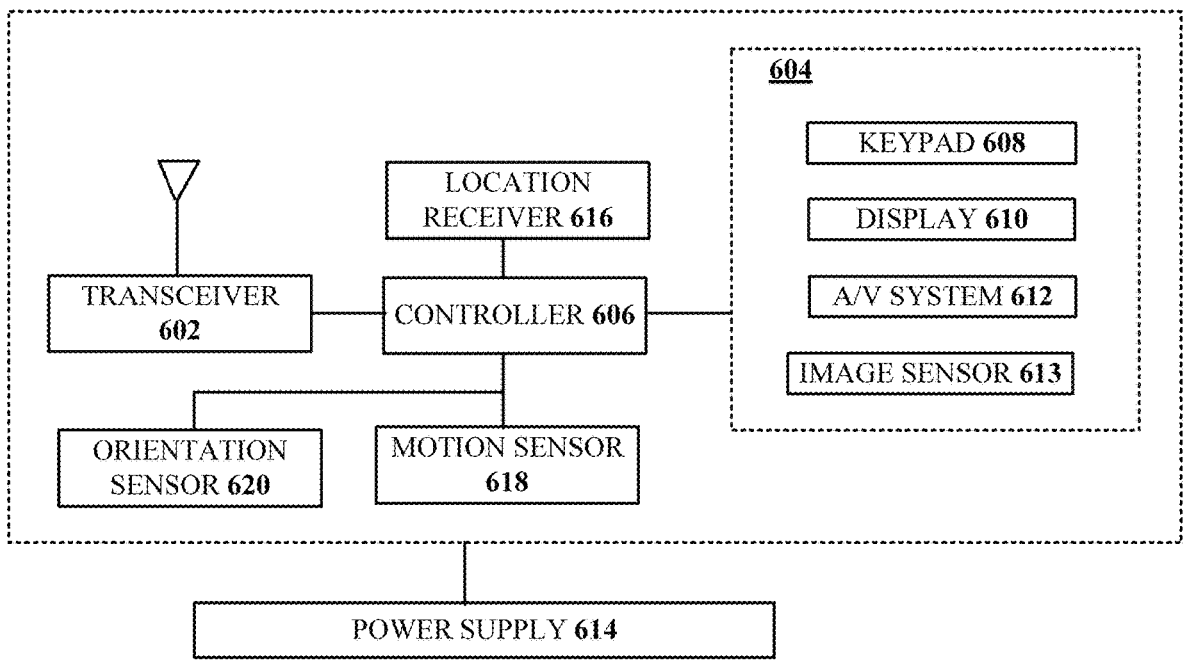
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part an IBN management system that utilizes generative AI and digital twins.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

a processing system including a processor; and a memory that stores executable instructions that, when executed by the processing system, facilitate performance of operations, the operations comprising:

receiving network operator-level intents from a large language model that translates high level intents into the network operator-level intents, wherein the network operator-level intents are specific to network operators and comprise a first operator-level intent associated with a first network operator having a first number of radio access network (RAN) nodes and a second operator-level intent associated with a second network operator having a second number of RAN nodes;

interpreting the network operator-level intents, extracting intent functions, and mapping the network operator-level intents into the intent functions, wherein the intent functions comprise a function to subscribe to measurements, a function to update cell configurations, and a function to apply control policies in the RAN;

performing a function call to the mapped intent functions;

performing two-level conflict resolutions comprising performing network operator-level intent conflict resolution on the network operator-level intents and performing application level intent conflict resolution, wherein the network operator-level intent conflict resolution is performed by identifying a network operator-level conflict configured to have overlapping requirements or mutually exclusive configuration between the first operator-level intent and the second operator-level intent, and wherein the application level intent conflict resolution is performed regarding an application level conflict that affect a same key performance indicator (KPI); and applying the intent functions to modify RAN policies to effect RAN changes in accordance with the high level intents.

2. The device of claim 1, wherein the operations further comprise application-level conflict resolution of the intent functions.

3. The device of claim 1, wherein the mapping the network operator-level intents into the intent functions comprises accessing the intent functions via application programming interface (API) calls.

4. The device of claim 1, wherein the performing network operator-level intent conflict resolution is in accordance with requirements provided by a policy auditor.

5. The device of claim 1, wherein the intent functions comprise updating cell configurations.

6. The device of claim 1, wherein the applying the intent functions comprises applying the intent functions to a digital twin of a physical RAN.

7. The device of claim 6, wherein the operations further comprise applying the intent functions to the physical RAN.

8. The device of claim 1, wherein the high level intents specify an expected increase in network users.

9. The device of claim 8, wherein the network operator-level intents specify an increased bandwidth requirement to support the expected increase in network users.

10. A non-transitory machine-readable medium, comprising executable instructions that, when executed by a processing system including a processor, facilitate performance of operations, the operations comprising:

receiving network operator-level intents from a large language model that translates high level intents into the network operator-level intents, wherein the network operator-level intents are specific to network operators and comprise a first operator-level intent associated with a first network operator having a first number of radio access network (RAN) nodes and a second operator-level intent associated with a second network operator having a second number of RAN nodes;

interpreting the network operator-level intents, extracting intent functions, and mapping the network operator-level intents into the intent functions, wherein the intent functions comprise a function to subscribe to measurements, a function to update cell configurations, and a function to apply control policies in the RAN;

performing a function call to the mapped intent functions;

performing two-level conflict resolutions comprising performing network operator-level intent conflict resolution on the network operator-level intents and performing application level intent conflict resolution, wherein the network operator-level intent conflict resolution is performed by identifying a network operator-level conflict configured to have overlapping requirements or mutually exclusive configuration between the first operator-level intent and the second operator-level intent, and wherein the application level intent conflict resolution is performed regarding an application level conflict that affect a same key performance indicator (KPI); and applying the intent functions to modify RAN policies to effect RAN changes in accordance with the high level intents.

11. The non-transitory machine-readable medium of claim 10, wherein the operations further comprise application-level conflict resolution of the intent functions.

12. The non-transitory machine-readable medium of claim 10, wherein the mapping the network operator-level intents into the intent functions comprises accessing the intent functions via application programming interface (API) calls.

13. The non-transitory machine-readable medium of claim 10, wherein the performing network operator-level intent conflict resolution is in accordance with requirements provided by a policy auditor.

14. The non-transitory machine-readable medium of claim 10, wherein the intent functions comprise updating cell configurations.

15. The non-transitory machine-readable medium of claim 10, wherein the applying the intent functions comprises applying the intent functions to a digital twin of a physical RAN.

16. The non-transitory machine-readable medium of claim 15, wherein the operations further comprise applying the intent functions to the physical RAN.

17. A method, comprising:

receiving, by a processing system including a processor, network operator-level intents from a large language model that translates high level intents into the network operator-level intents, wherein the network operator-level intents are specific to network operators and comprise a first operator-level intent associated with a first network operator having a first number of radio access network (RAN) nodes and a second operator-level intent associated with a second network operator having a second number of RAN nodes;

interpreting, by the processing system, the network operator-level intents, extracting intent functions, and mapping, by the processing system, the network operator-level intents into the intent functions, wherein the intent functions comprise a function to subscribe to measurements, a function to update cell configurations, and a function to apply control policies in the RAN;

performing, by the processing system, a function call to the mapped intent functions;

performing, by the processing system, two-level conflict resolutions comprising performing network operator-level intent conflict resolution on the network operator-level intents and performing application level intent conflict resolution, wherein the network operator-level intent conflict resolution is performed by identifying a network operator-level conflict configured to have overlapping requirements or mutually exclusive configuration between the first operator-level intent and the second operator-level intent, and wherein the application level intent conflict resolution is performed regarding an application level conflict that affect a same key performance indicator (KPI); and applying, by the processing system, the intent functions to modify RAN policies to effect RAN changes in accordance with the high level intents.

18. The method of claim 17, wherein the applying the intent functions comprises applying the intent functions to a digital twin of a physical RAN.

19. The method of claim 18, wherein the operations further comprise applying, by the processing system, the intent functions to the physical RAN.

20. The method of claim 18, wherein the operations further comprise iterating changes to the RAN policies in the digital twin before applying the changes to the physical RAN.

\* \* \* \* \*